US010735308B2

(12) United States Patent
Voit et al.

(10) Patent No.: US 10,735,308 B2
(45) Date of Patent: Aug. 4, 2020

(54) ATTESTATION BASED ROUTING

(71) Applicant: Cisco Technology, Inc., San Jose, CA (US)

(72) Inventors: Eric Voit, Bethesda, MD (US); Shwetha Subray Bhandari, Bangalore (IN); William F. Sulzen, Apex, NC (US); Sujal Sheth, Gujarat (IN)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 16/230,751

(22) Filed: Dec. 21, 2018

(65) Prior Publication Data
US 2020/0204476 A1    Jun. 25, 2020

(51) Int. Cl.
| | |
|---|---|
| *H04L 12/761* | (2013.01) |
| *H04L 29/06* | (2006.01) |
| *H04L 12/721* | (2013.01) |
| *H04L 12/773* | (2013.01) |
| *H04L 12/751* | (2013.01) |

(52) U.S. Cl.
CPC .............. *H04L 45/16* (2013.01); *H04L 45/02* (2013.01); *H04L 45/123* (2013.01); *H04L 45/60* (2013.01); *H04L 63/12* (2013.01)

(58) Field of Classification Search
CPC ................................ H04L 45/16; H04L 45/02
USPC ......................................................... 709/238
See application file for complete search history.

(56) References Cited

U.S. PATENT DOCUMENTS

| | | | |
|---|---|---|---|
| 9,032,094 B2 | 5/2015 | Carter et al. | |
| 2005/0033980 A1* | 2/2005 | Willman | ................. G06F 21/57 726/26 |
| 2007/0297405 A1* | 12/2007 | He | .......................... H04L 45/00 370/389 |
| 2010/0218236 A1 | 8/2010 | Hardjono et al. | |

(Continued)

OTHER PUBLICATIONS

Huang et al., DAAODV: A Secure Ad-hoc Routing Protocol based on Direct Anonymous Attestation, 2009, IEEE Computer Society (8 pages).*

(Continued)

*Primary Examiner* — Wing F Chan
*Assistant Examiner* — Leon Y Tseng
(74) *Attorney, Agent, or Firm* — Behmke Innovation Group LLC; James M. Behmke; Jonathon P. Western

(57) ABSTRACT

At a networking device, a method includes obtaining, according to a predefined protocol, a first plurality of attestation vectors from a corresponding plurality of candidate next-hop nodes. Each of the plurality of candidate next-hop nodes is included within a respective route between a particular node and a destination node. The method further includes determining a plurality of confidence scores. Each of the plurality of confidence scores is based on a comparison between a corresponding one of the first plurality of attestation vectors and a trusted image vector. The method further includes selecting, from the plurality of confidence scores, a particular confidence score that satisfies one or more selection criteria. Each of the particular confidence score is associated with a particular candidate next-hop node of the plurality of candidate next-hop nodes. The method further includes directing, to the particular candidate next-hop node, a data packet destined for the destination node.

20 Claims, 7 Drawing Sheets

(56) References Cited

U.S. PATENT DOCUMENTS

2014/0115659 A1* 4/2014 Attfield ............... G06F 21/51
726/1
2015/0288659 A1 10/2015 Lukacs et al.

OTHER PUBLICATIONS

Li et al., "Enhancing the Trust of Internet Routing with Lightweight Route Attestation", 6th ACM Symposium on Information, Computer and Communications Security, ASIACCS, IEEE T Inf Foren Sec., Mar. 2011, pp. 1-13.
TCG Guidance for Securing Network Equipment, Committee Draft, Version 1, Revision 26b, Jul. 3, 2017, pp. 1-61.
Zhang et al., "Presence Attestation: The Missing Link in Dynamic Trust Bootstrapping", Session A2: Human Authentication, CCS'17, Oct. 30-Nov. 3, 2017, Dallas, TX, pp. 1-14.

* cited by examiner

US 10,735,308 B2

ATTESTATION BASED ROUTING

TECHNICAL FIELD

The present disclosure generally relates to routing network traffic, and in particular, to attestation based routing.

BACKGROUND

Generally, a network today includes a host of nodes that route traffic (e.g., data packets) through the network. It is, therefore, not uncommon for a data packet to traverse a number of nodes while travelling from a source node to a destination node. Likewise, it is not uncommon for multiple data paths to exist between the source node and the destination node.

While having a multitude of nodes enables greater network connectivity, it also introduces greater security risks. For every node added there is an associated risk for the node to be compromised (e.g., hacked or captured). Nevertheless, the public's demand for increasingly expansive networks entails more, not fewer, nodes in any given network. Accordingly, in order to securely route traffic between a source node and a destination node, there is a need to verify the security of nodes included within a path between a source node and a destination node. Current systems, however, fail to provide robust and reliable security verification measures.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
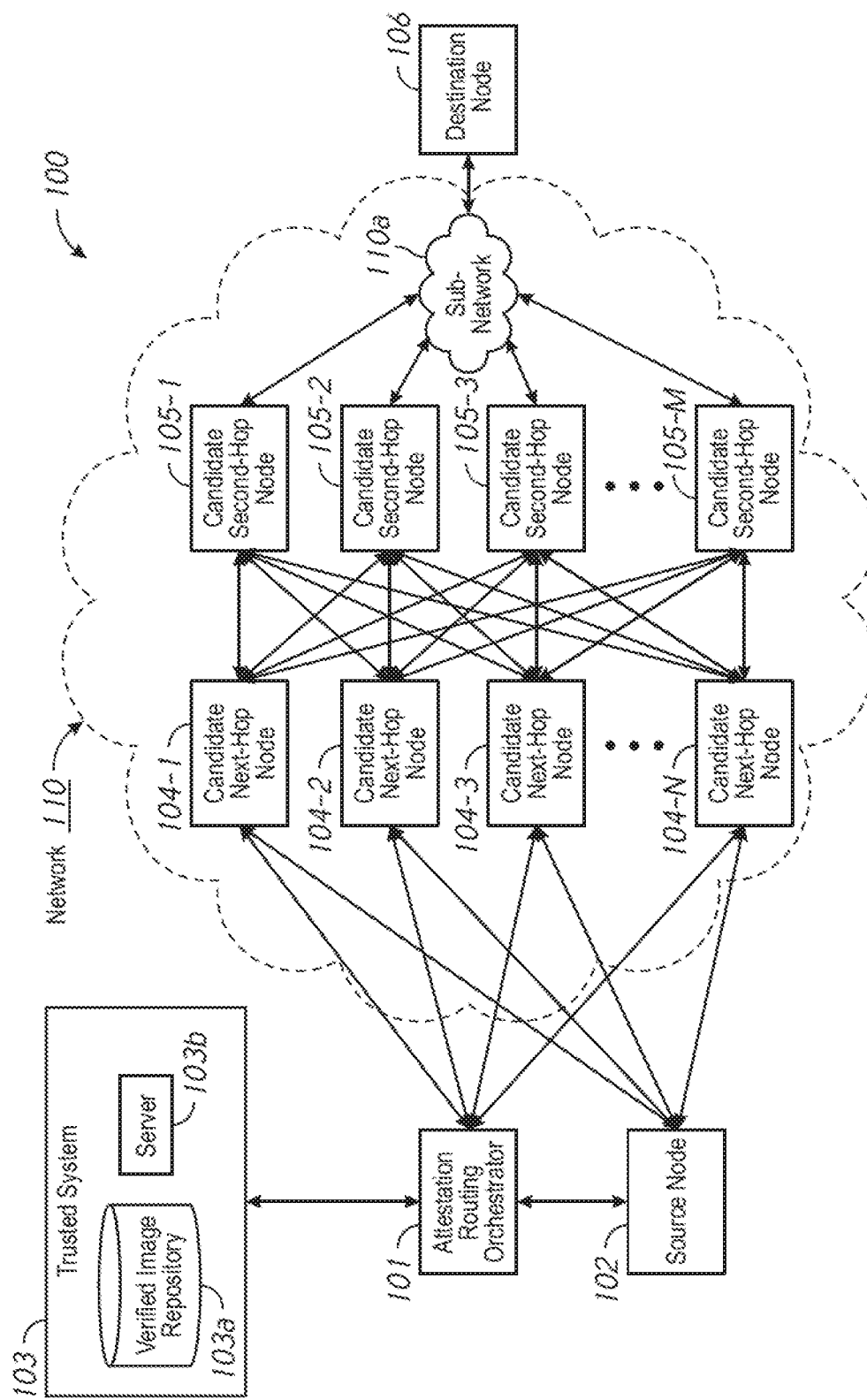
FIG. 1 is a block diagram of an example of a networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for directing data packets according to attestation based routing. These devices, systems, and, methods ameliorate and/or resolve a number of technical problems. For example, the present disclosure provides more robust and more reliable security verification of nodes by exploiting attestation based verification.

The method comprises, obtaining, at a networking device, according to a predefined protocol, a first plurality of attestation vectors from a corresponding plurality of candidate next-hop nodes. Each of the plurality of candidate next-hop nodes is included within a respective route between a particular node and a destination node. The method further comprises determining a plurality of confidence scores. Each of the plurality of confidence scores is based on a comparison between a corresponding one of the first plurality of attestation vectors and a trusted image vector. The method further comprises selecting, from the plurality of confidence scores, a particular confidence score that satisfies one or more selection criteria. The particular confidence score is associated with a particular candidate next-hop node of the plurality of candidate next-hop nodes. The method further comprises directing, to the particular candidate next-hop node, a data packet destined for the destination node.

In accordance with some implementations, a networking device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a networking device, cause the networking device to perform or cause performance of any of the methods described herein. In accordance with some implementations, a networking includes: one or more processors, a non-transitory memory, and means for performing or causing performance of any of the methods described herein.

Example Embodiments

Certain previous systems rely on the freshness (e.g., the recency) of measurements of a node in order to verify the security (e.g., trustworthiness) of the node. This is problematic because the reliability and accuracy of the verification is proportional to the frequency with which measurements are taken. Accordingly, a high utilization of network resources corresponds to a high reliability system, and vice versa. Another problem with a freshness-based system is that an attacker can inject previously recorded measurements into the node being verified (e.g., after gaining root access) in order to give the false appearance that the node has not been compromised. By contrast, various implementations disclosed herein verify the security (e.g., trustworthiness) of a node by comparing trusted information against corresponding information obtained from the node. In this way, verification proceeds irrespective of the freshness of information at the node. Moreover, utilization of the trusted information guards against the event where an attacker has changed information at the node.

Certain other previous systems provide a transactional process between the node making the verification request and the measurement device. For example, the requesting node provides a random number (e.g., a nonce) to the measurement device, which provides a signature across the response, including the returned random number itself. This indicates that the information is not being replayed from a time before the random number was available to the measurement device. Such a dependency of the requesting node for each signed response is problematic because the system is grounded in a transactional challenge and/or response interaction model. In other words, this system does not support unidirectional verification communications originating from the requesting node, such as an asynchronous push, multicast, broadcast message, and/or the like. By contrast, the attestation based routing disclosed herein supports these types of communications.

FIG. 1 is a block diagram of an example of a networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the first example of the networking environment 100 includes a network 110 that includes a sub-network 110a. In some implementations, the sub-network 110a corresponds to a local area network (LAN) or virtual local area network (VLAN). In some implementations, the sub-network 110a corresponds to a wide area network (WAN), such as the Internet. In some implementations, the sub-network 110a includes a combination of nodes included within a LAN, VLAN, and/or WAN.

The networking environment 100 further includes a source node 102. The source node 102 corresponds to a networking device (e.g., switch, router, gateway, etc.) associated with a data packet that is destined for a destination node 106. The source node 102 is coupled to a plurality of candidate next-hop nodes 104-1-104-N. Each of the plurality of candidate next-hop nodes 104-1-104-N is included within a respective route between the source node 102 and the destination node 106. Moreover, as illustrated in FIG. 1, each of the plurality of candidate next-hop nodes 104-1-104-N is connected to candidate second hop nodes 105-1-105M. One of ordinary skill in the art will appreciate that, in various implementations, each of the plurality of candidate next-hop nodes 104-1-104-N is connected to a subset of the candidate second hop nodes 105-1-105M (not shown).

The networking environment 100 further includes an attestation routing orchestrator 101. As with the source node 102, the attestation routing orchestrator 101 is coupled to the plurality of candidate next-hop nodes 104-1-104-N. In various implementations, the attestation routing orchestrator 101 obtains, according to a predefined protocol, a first plurality of attestation vectors from the candidate next-hop nodes 104-1-104-N. In some implementations, the attestation routing orchestrator 101 further obtains additional information from candidate second-hop nodes 105-1-105-M and utilizes the additional information in selecting the particular candidate next-hop node. Although not illustrated in FIG. 1, in some implementations, the attestation routing orchestrator 101 further obtains additional information from nodes that are more than two hops away (e.g., candidate third hop nodes, candidate fourth hop nodes, etc.).

The attestation routing orchestrator 101 is further coupled to a trusted system 103. In various implementations, the attestation routing orchestrator 101 obtains a trusted image vector from the trusted system 103. The trusted system 103 includes a verified image repository 103a and a server 103b. In some implementations, the trusted system 103 includes one or more trusted image vectors that are known with a high degree of confidence to have not been compromised (e.g., hacked, attacked, improperly accessed, etc.). For example, in some implementations, the trusted system 103 is part of a stub network.

As will be described in great detail with reference to FIG. 4, the attestation routing orchestrator 101 selects, and directs a data packet to, a particular candidate next-hop node of the plurality of candidate next-hop nodes 104-1-104-N based on the trusted image vector and the first plurality of attestation vectors. Moreover, the attestation routing orchestrator 101 directs the data packet destined for the destination node 106 to the particular candidate next-hop node.

Figure 2:
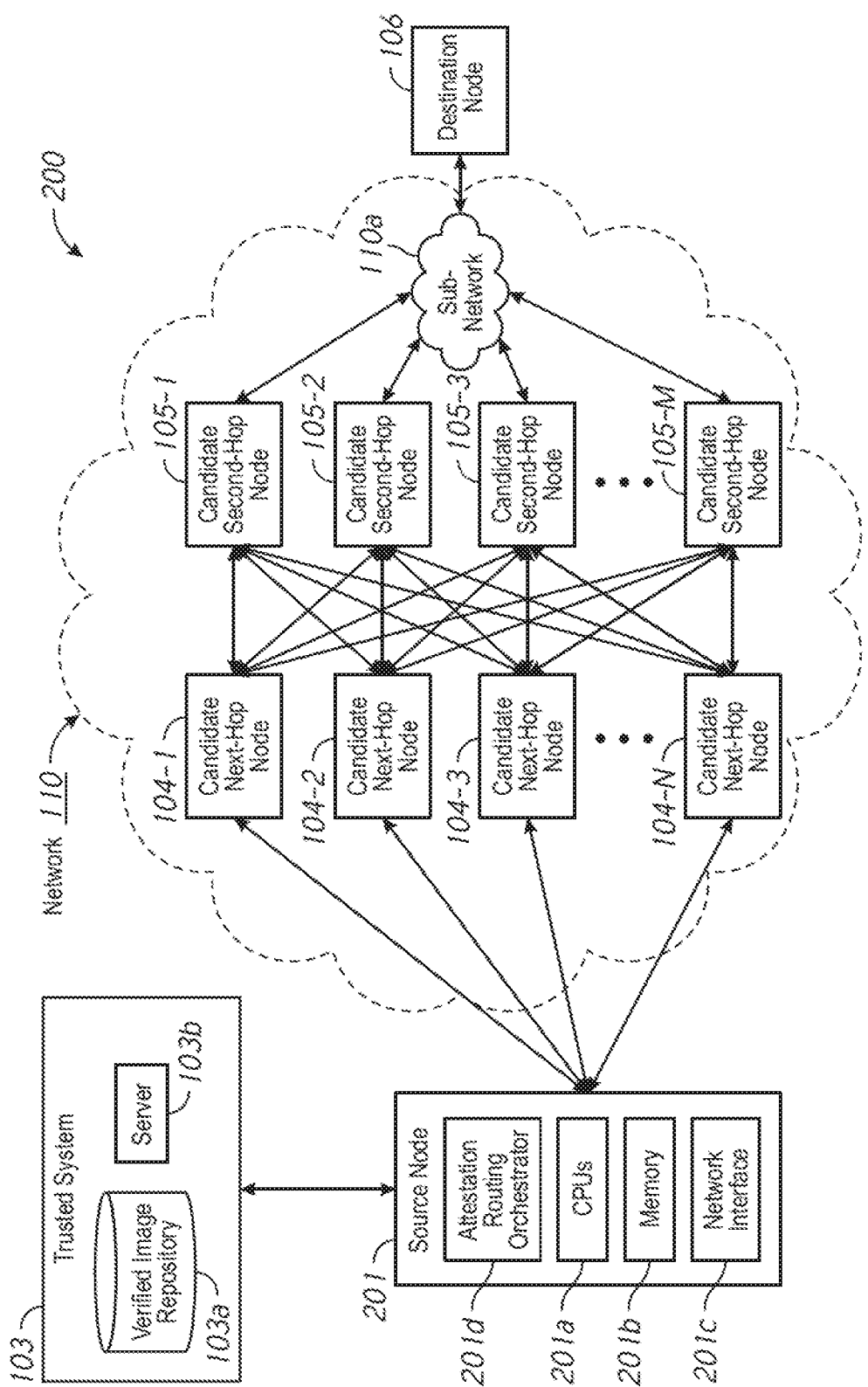
FIG. 2 is a block diagram of an example of a networking environment in accordance with some implementations.

FIG. 2 is a block diagram of an example of a networking environment 200 in accordance with some implementations. Notably, in contrast to the networking environment 100 illustrated in FIG. 1, the networking environment 200 includes a source node 201 that includes an attestation routing orchestrator 201d. In various implementations, the attestation routing orchestrator 201d is similar to and adapted from the attestation routing orchestrator 101 in FIG. 1.

The source node 201 further includes one or more CPUs 201a. In various implementations, the one or more CPUs 201a provide processing resources for generating a plurality of confidence scores for the corresponding plurality of candidate next-hop nodes 104-1-104-N. In various implementations, the one or more CPUs 201a provide processing resources for selecting a particular confidence score of the plurality of confidence scores that satisfies one or more selection criteria. A more detailed description of these features is provided with reference to FIG. 5, below.

The source node 201 further includes a memory 201b. In various implementations, the memory 201b corresponds to a non-transitory memory, such as RAM, ROM, etc. In some implementations, the memory 201b stores the data packet destined for the destination node 106. In some implementations, the memory 201b stores a trusted image vector obtained from the trusted system 103. In some implementations, the memory 201b stores a first plurality of attestation vectors obtained from the corresponding plurality of candidate next-hop nodes 104-1-104-N and optionally a second plurality of attestation vectors obtained from the corresponding plurality of candidate second hop nodes 105-1-105-M. The source node 201 further includes a network interface 201c for obtaining, receiving, and transmitting the aforementioned data packets and vectors.

As will be further described with reference to FIG. 5, in various implementations, the source node 201 selects, and directs a data packet to, a particular candidate next-hop node based the trusted image vector and the first plurality of attestation vectors.

Figure 3:
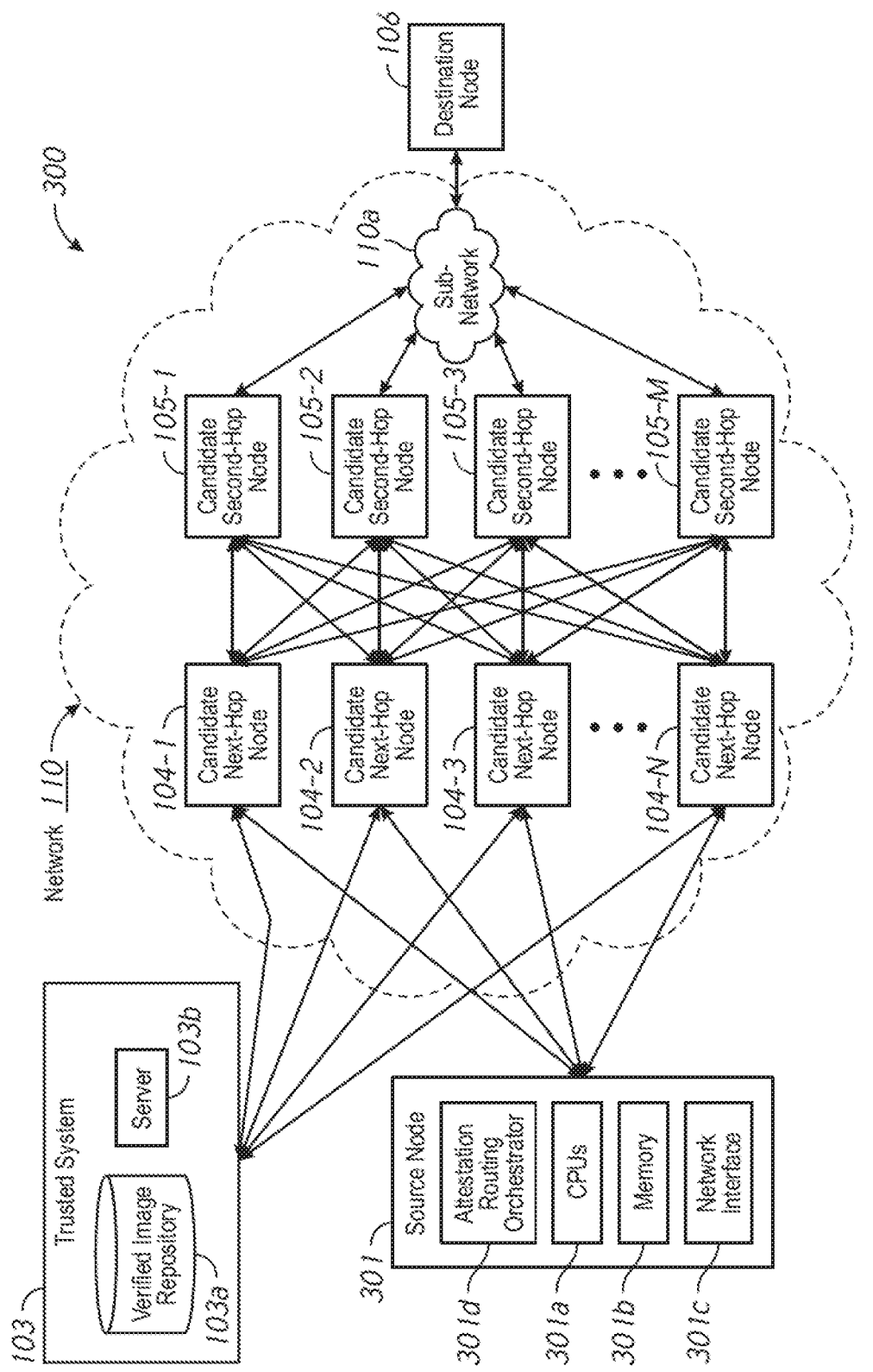
FIG. 3 is a block diagram of an example of a networking environment in accordance with some implementations.

FIG. 3 is a block diagram of an example of a networking environment 300 in accordance with some implementations. Notably, in contrast to the networking environment 100 illustrated in FIG. 1 and the networking environment 200 in FIG. 2, in the networking environment 300 a particular one of the plurality of candidate next-hop nodes 104-1-104-N relays a trusted image vector from the trusted system 103 to the source node 301. In various implementations, the attestation routing orchestrator 301d is similar to and adapted from the attestation routing orchestrator 101 in FIG. 1 and/or the attestation routing orchestrator 201d in FIG. 2.

In some implementations, the trusted system 103 signs the trusted image vector and provides the signed trusted image vector to the particular candidate next hop node, which in turn provides the signed trusted image vector to the source node 301. In some implementations, having the particular candidate next hop node provide the signed trusted image vector reduces attestation time (e.g., the time to determine trustworthiness of the particular candidate next hop node) because the source node 301 need not contact a remote node (trusted system 103). In some implementations, attestation time is further reduced because a single attestation process (e.g., the trusted system 103 signing the trusted image vector) facilitates the attesting of multiple source nodes. In other words, trusted image vectors need not be generated and evaluated on a per source node basis. Moreover, in implementations in which the source node 301 is not connected to the trusted system 103 (e.g., link down), obtaining the trusted image vector from the particular candidate next hop provides an alternative mechanism for node attestation. In some implementations, the trusted system 103 appends a time-stamped response to the trusted image vector as part of the signing process, sometimes referred to as stapling. Consequently, the source node 301 need not contact the trusted system 103 in order to attest a particular candidate next hop node.

Figure 4:
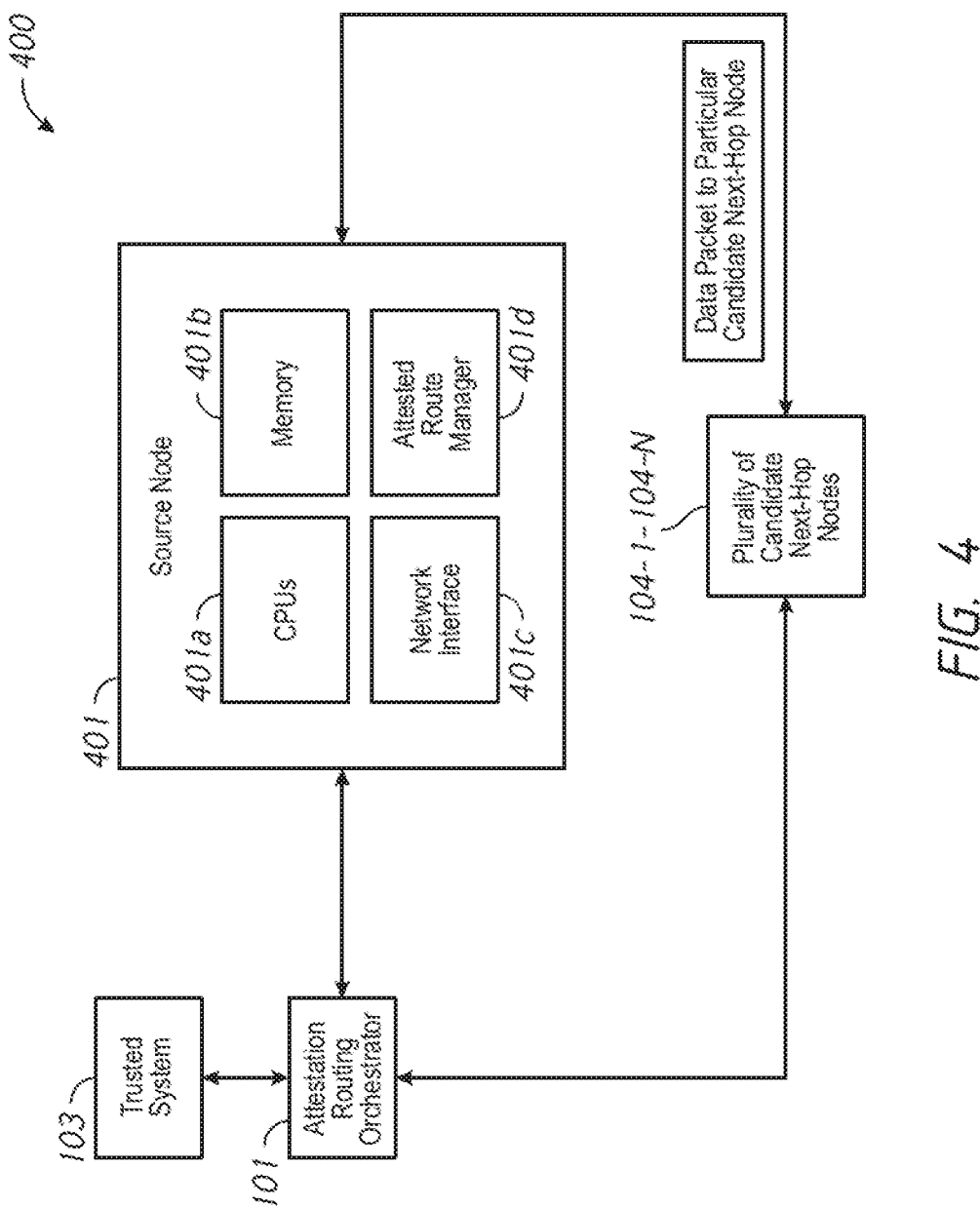
FIG. 4 is a block diagram of controller orchestrated attestation based routing in accordance with some implementations.

FIG. 4 is a block diagram of controller orchestrated attestation based routing 400 in accordance with some implementations. In various implementations, the source node 401 is similar to and adapted from the source node 102 in FIG. 1. As illustrated in FIG. 4, the attestation routing orchestrator 101 is separate from but coupled (e.g., connected) to the source node 401. In various implementations, the attestation routing orchestrator 101 corresponds to a controller with knowledge of the network that includes the plurality of candidate next-hop nodes and optionally the plurality of candidate second-hop nodes. For example, in some implementations, the attestation routing orchestrator 101 corresponds to a network management system (NMS). As another example, in some implementations, the attestation routing orchestrator 101 corresponds to an intent-based networking system, such as Cisco's digital network architecture (DNA). As yet another example, in some implementations, the attestation routing orchestrator 101 corresponds to a wireless LAN controller (WLC), while the plurality of candidate next-hop nodes 104-1-104-N and optionally the plurality of candidate second hop nodes correspond to networking devices (e.g., access points, user devices, etc.)

The attestation routing orchestrator 101 obtains, according to a predefined protocol, a first plurality of attestation vectors from the plurality of candidate next-hop nodes 104-1-104-N. Each of the plurality of candidate next-hop nodes 104-1-104-N is included within a respective route between the source node 401 and a destination node. In various implementations, the respective routes are independent of each other.

The attestation routing orchestrator 101 determines a plurality of confidence scores. Each of the plurality of confidence scores is based on a comparison between a corresponding one of the first plurality of attestation vectors and a trusted image vector. In various implementations, the attestation routing orchestrator 101 obtains the trusted image vector from the trusted system 103.

In various implementations, the attestation routing orchestrator 101 obtains, according to the predefined protocol, a second plurality of attestation vectors from a corresponding plurality of candidate second-hop nodes. Each of the plurality of candidate second-hop nodes is included within a respective route between a corresponding one of the plurality of candidate next-hop nodes 104-1-104-N and the destination node. According to these implementations, each of the plurality of confidence scores is additionally based on a comparison between a corresponding one of the second plurality of attention vectors and the trusted image vector in combination with the comparison between the corresponding one of the first plurality of attestation vectors and the trusted image vector.

The attestation routing orchestrator 101 selects, from the plurality of confidence scores, a particular confidence score that satisfies one or more selection criteria. The particular confidence score is associated with a particular candidate next-hop node of the plurality of candidate next-hop nodes 104-1-104-N.

The attestation routing orchestrator 101 directs, to the particular candidate next-hop node, a data packet destined for the destination node. For example, in various implementations, the attestation routing orchestrator 101 provides attested route information to an attested route manager 401d of the source node 401 in order to facilitate the source node 401 sending the data packet to the particular candidate next-hop node. The attested route information is indicative of the trustworthiness of each of the plurality of candidate next-hop nodes 104-1-104-N.

For example, in some implementations, the attested route information includes an identifier (e.g., IP address, MAC address, SSID, etc.) identifying a secure, particular candidate next-hop node of the plurality of candidate next-hop nodes 104-1-104-N. In this example, the source node 401 provides the data packet based on the identifier in order to route the data packet to the secure, particular candidate next-hop node.

As another example, in some implementations, the attested route information includes a plurality of confidence scores associated with the plurality of candidate next-hop nodes 104-1-104-N. The determination of confidence scores will be described in further detail, below. In this example, the attested route manager 401d selects a particular candidate score based on one or more selection criteria, which also be described in further detail, below. Moreover, the attested route manger 401d provides the data packet to the particular next-hop node associated with the particular candidate score. In various implementations, the attestation routing orchestrator 101 ceases to direct additional data packets to the particular candidate next-hop node in response to determining that the particular confidence score falls below a confidence threshold.

In various implementations, the source node 401 includes one or more CPUs 401a. In various implementations, the one or more CPUs 401a provide processing resources for managing attested route information obtained from the attestation routing orchestrator 101. The source node 401 further includes a memory 401b. In various implementations, the memory 401b corresponds to a non-transitory memory, such as RAM, ROM, etc. In some implementations, the memory 401b stores the obtained attested route information and data packets to be transmitted. The source node 401 further includes a network interface 401c for obtaining the attested route information.

Figure 5:
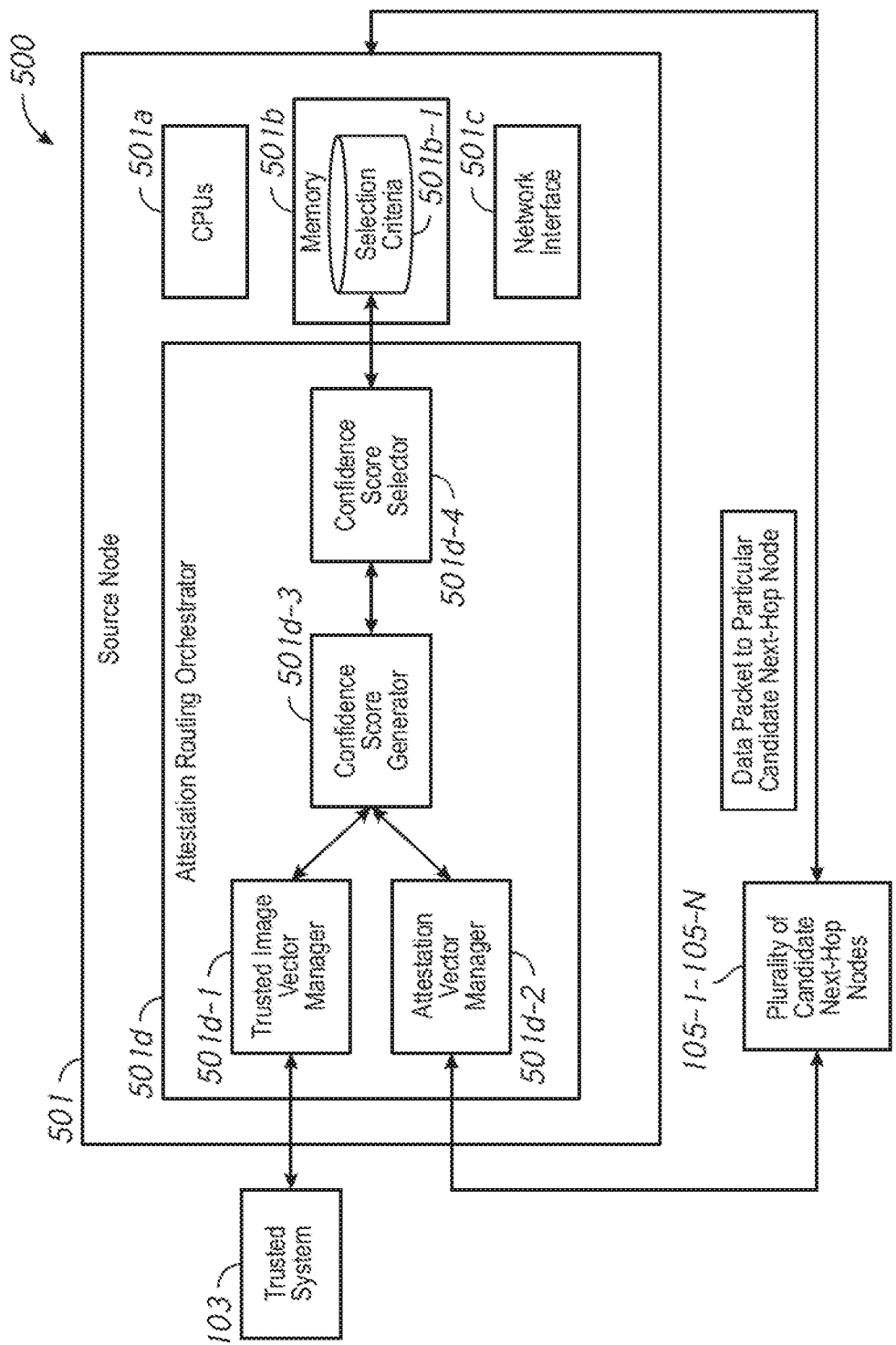
FIG. 5 is a block diagram of source node orchestrated attestation based routing in accordance with some implementations.

FIG. 5 is a block diagram of source node orchestrated attestation based routing 500 in accordance with some implementations. In various implementations, the source node 501 is similar to and adapted from the source node 301 in FIG. 3. Notably, in contrast to the source node 401 in FIG.

4, the source node 501 in FIG. 5 includes an attestation routing orchestrator 501d that performs attestation based security verification. To that end, the attestation routing orchestrator 501d includes a trusted image vector manager 501d-1, an attestation vector manager 501d-2, a confidence score generator 501d-3, and a confidence score selector 501d-4.

The attestation vector manager 501d-2 obtains, according to a predefined protocol, a first plurality of attestation vectors from a corresponding plurality of candidate next-hop nodes 104-1-104-N. Each of the plurality of candidate next-hop nodes 104-1-104-N is included within a respective route between the source node 501 and a destination node. In various implementations, the respective routes are independent of each other.

In various implementations, the predefined protocol corresponds to a layer-two (L2) protocol, such as a 802.1x based protocol. In some implementations, one or more of first plurality of attestation vectors are included within control plane payloads associated with L2 link establishment processes between corresponding one or more candidate next-hop nodes and the networking device. In some implementations, a point-to-multipoint (PMP) topology characterizes the networking device relative to the plurality of candidate next-hop nodes. For example, a PMP topology is deployed, and the devices communicate according to a L2 protocol.

In various implementations, the predefined protocol corresponds to a layer-three (L3) protocol. Examples of implementable L3 protocols are Internet Protocol Security (IPsec) and Transport Layer Security (TLS).

The confidence score generator 501d-3 determines a plurality of confidence scores. Each of the plurality of confidence scores is based on a comparison between a corresponding one of the first plurality of attestation vectors and a trusted image vector. In various implementations, the trusted image vector manager 501d-1 obtains the trusted image vector from the trusted system 103. Although not depicted, in various implementations, the trusted image vector manager 501d-1 obtains the trusted image vector from a particular one of the plurality of candidate next-hop nodes 104-1-104-N, which itself obtains the trusted image vector from the trusted system 103, as is illustrated in FIG. 3.

In various implementations, the attestation vector manager 501d-2 obtains, according to the predefined protocol, a second plurality of attestation vectors from a corresponding plurality of candidate second-hop nodes. Each of the plurality of candidate second-hop nodes is included within a respective route between a corresponding one of the plurality of candidate next-hop nodes 104-1-104-N and the destination node. According to these implementations, each of the plurality of confidence scores is additionally based on a comparison between a corresponding one of the second plurality of attention vectors and the trusted image vector in combination with the comparison between the corresponding one of the first plurality of attestation vectors and the trusted image vector.

The confidence score selector 501d-4 selects, from the plurality of confidence scores, a particular confidence score that satisfies one or more selection criteria 501b-1. In various implementations, the one or more selection criteria 501b-1 are allocated within a memory 501b of the source node 501. The particular confidence score is associated with a particular candidate next-hop node of the plurality of candidate next-hop nodes 104-1-104-N.

The source node 501 directs, to the particular candidate next-hop node, a data packet destined for the destination node. In various implementation, the source node 501 provides (e.g., forwards, transmits, etc.) the data packet to the particular candidate next-hop node. In various implementations, The source node 501 ceases to direct additional data packets to the particular candidate next-hop node in response to determining that the particular confidence score falls below a confidence threshold.

In various implementations, the source node 501 includes one or more CPUs 501a. In various implementations, the one or more CPUs 501a provide processing resources for attestation routing orchestrator 501d. The source node 501 further includes a memory 501b. In various implementations, the memory 501b corresponds to a non-transitory memory, such as RAM, ROM, etc. In some implementations, the memory 501b-1 stores the one or more selection criteria, the trusted image vector, and the attestation vectors. The source node 501 further includes a network interface 501c for obtaining the trusted image vector, attestation vectors, the data packet to be forwarded, and providing the data packet to the particular candidate next-hop node.

Figure 6:
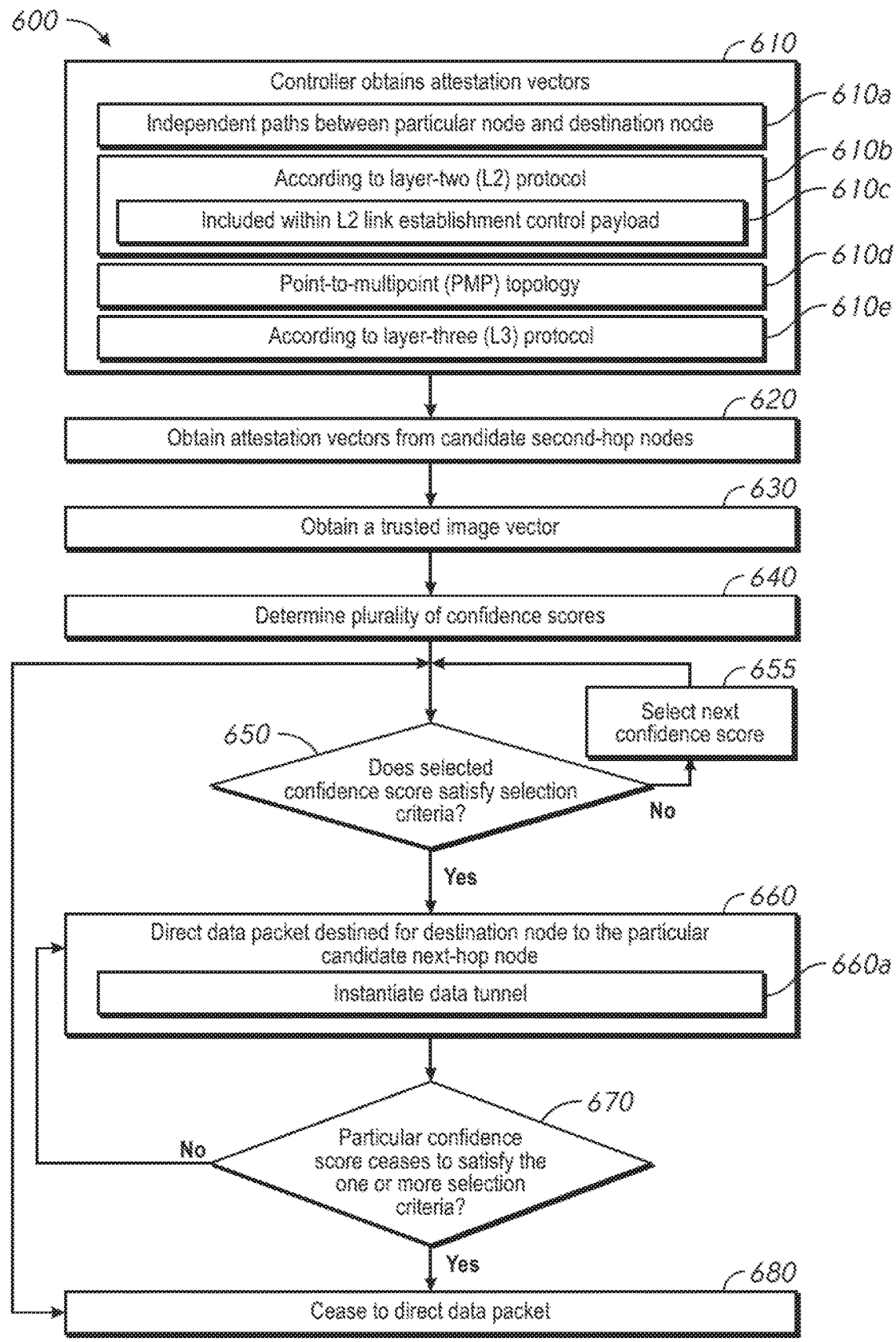
FIG. 6 is a flowchart representation of a method of attestation based routing in accordance with some implementations.

FIG. 6 is a flowchart representation of a method 600 of attestation based routing in accordance with some implementations. In various implementations, the method 600 is performed by a networking device, such as a router or switch. For example, in some implementations, the method 600 is performed by a controller (e.g., the attestation routing orchestrator 101 and/or the trusted system 103). As another example, in some implementations, the method 600 is performed by a source node (e.g., the source node 501 in FIG. 5). In various implementations, portions of the method 600 are performed across multiple devices (e.g., a distributed flow). For example, in some implementations, a controller obtains attestation vectors, as represented by block 610, and a router selects, from confidence scores associated with the attestation vectors, a particular confidence score that satisfies one or more selection criteria, as represented by block 650. As another example, in some implementations, a router obtains attestation vectors, as represented by block 610, and a controller selects, from confidence scores associated with the attestation vectors, a particular confidence score that satisfies one or more selection criteria, as represented by block 650. Briefly, the method 600 includes obtaining attestation vectors, generating corresponding confidence scores by comparing the attestation vectors to a trusted image vector, and directing a data packet to a selected candidate next-hop node associated with a confidence score that satisfies certain criteria.

To that end, as represented by block 610, the method 600 includes obtaining, according to a predefined protocol, a first plurality of attestation vectors from a corresponding plurality of candidate next-hop nodes (e.g., the plurality of candidate next-hop nodes 104-1-104-N in FIG. 1). Each of the plurality of candidate next-hop nodes is included within a respective route between a particular node and a destination node.

The first plurality of attestation vectors may include a variety of categories of attestation information to be compared to corresponding information in a trusted image vector. Accordingly, the trustworthiness of corresponding candidate next-hop nodes may be attested. For example, in some implementations, a particular attestation vector of the first plurality of attestation vectors (sometimes hereinafter "an attestation vector") includes code (e.g., boot-up code). As another example, in some implementations, an attestation vector includes configuration information, such as whether and which critical features were turned off during system boot-up. As yet another example, in some implementations, an attestation vector includes stamp indicators. Examples of stamp indicators are: measure boot-stamps (e.g., security hash algorithm 1 (SHA1) hash over PCRs 0-7); verified boot-stamps (e.g., recognized binaries were executed during boot); process stamps (e.g., root-of-trust validated through a particular process that is asserting a particular protocol or protocols); file system stamps (e.g., expected files within a vendor determined set of directories); log integrity stamps (e.g., logs on software changes made on a particular candidate next-hop node); configuration stamps (e.g., state of current device); and/or the like. As yet another example, in some implementations, an attestation vector includes peer neighbor bootstrap+iOAM. As yet another example, in some implementations, an attestation vector includes software version checksums for various processes. As yet another example, in some implementations, an attestation vector includes proof that a particular candidate next-hop node is known to support trusted storage for any of the information being provided, and/or integrity of hardware components such as CPU, network processing units (NPUs), and/or the like.

As represented by block 610a, in some implementations, the respective routes are independent of each other. For example, in some implementations, the respective routes overlap one each to some extent, but differ in certain route segments. As another example, in some implementations, the respective routes do not overlap with each other.

In some implementations, the destination node corresponds to one of the plurality of candidate next-hop nodes. In other words, the data packet is one hop away from its destination. In some implementations, the particular node is a peer node of the plurality of candidate next-hop nodes. For example, the particular node and the plurality of candidate next-hop nodes correspond to user device (e.g., smartphones, tablets) that are within the coverage area of the same access point (AP). As another example, the particular node and the plurality of candidate next-hop nodes correspond to APs that are being managed by the same controller (e.g., WLC).

As represented by block 610b, in various implementations, the predefined protocol corresponds to a layer-two (L2) protocol, such as a 802.1x protocol. In some implementations, the first plurality of attestation vectors are obtained over respective control links, such as within layer-two (L2) management frames. As represented by block 610c, in some implementations, one or more of first plurality of attestation vectors are included within control plane payloads associated with L2 link establishment processes between corresponding one or more candidate next-hop nodes and the networking device. For example, in some implementations, an attestation vector is obtained within an extensible authentication protocol over LAN (EAPOL) control message. Continuing with example, in some implementations, 802.1x is utilized because it allows for a continuous verification.

In various implementations, as represented by block 610d, the method 600 includes that a point-to-multipoint (PMP) topology characterizes the networking device relative to the plurality of candidate next-hop nodes. For example, in some implementations, Ethernet L2 connections exist between the networking device and the plurality of candidate next-hop nodes in a PMP topology.

As represented by block 610e, in various implementations, the predefined protocol corresponds to a layer-three (L3) protocol. For example, in some implementations, the predefined protocol corresponds to Internet Protocol Security (IPsec). For example, in some implementations, the predefined protocol corresponds to Transport Layer Security (TLS).

As represented by block 620, in various implementations, the method 600 includes obtaining, according to the predefined protocol, a second plurality of attestation vectors from a corresponding plurality of candidate second-hop nodes (e.g., the plurality of candidate second-hop nodes 105-1-105-M in FIG. 1). Each of the plurality of candidate second-hop nodes is included within a respective route between a corresponding one of the plurality of candidate next-hop nodes and the destination node. In some implementations, the respective routes associated with the plurality of candidate second-hop nodes are independent of each other.

As represented by block 630, in various implementations, the method 600 includes obtaining a trusted image vector. In some implementations, the trusted image vector is obtained from a trusted system, such as the trusted image system 103 in FIGS. 1 and 2. In some implementations, the trusted system corresponds to a server. For example, the trusted system corresponds to an authentication server, such as a authentication, authorization, and accounting (AAA) server according to a remote authentication dial-in user service (RADIUS) protocol. In some implementations, the trusted system corresponds to an enterprise system for a client device. In some implementations, the trusted system corresponds to an enterprise system for a client device, government agency system, cloud system, and/or the like. In some implementations, the trusted image vector includes trusted platform module (TPM) information, such as keys that identify candidate next-hop nodes and possibly other nodes (e.g., second-hop nodes). In some implementations, a particular one of the plurality of candidate next-hop nodes 104-1-104-N relays the trusted image vector from the trusted system, as is illustrated in FIG. 3.

As represented by block 640, the method 600 includes determining a plurality of confidence scores. Each of the plurality of confidence scores is based on a comparison between a corresponding one of the first plurality of attestation vectors and a trusted image vector. In some implementations, the value of a particular confidence score is based on the degree of similarity between attestation information within a respective candidate next-hop node and corresponding attestation information within the trusted image vector. In some implementations, each of the plurality of confidence scores is additionally based on a comparison between a corresponding one of the second plurality of attention vectors and the trusted image vector in combination with the comparison between the corresponding one of the first plurality of attestation vectors and the trusted image vector.

As represented by block 650, the method 600 includes selecting, from the plurality of confidence scores, a particular confidence score that satisfies one or more selection criteria. The particular confidence score is associated with a particular candidate next-hop node of the plurality of candidate next-hop nodes. In some implementations, the method 600 includes determining whether a selected confidence score of the plurality of confidence scores satisfies the one or more selection criteria. In some implementations, in response to determining that the selected confidence score does not satisfy the one or more selection criteria, the method 600 continues to block 655. As represented by block 655, in some implementations, the method 600 includes selecting the next (e.g., a different) confidence score of the plurality of confidence scores; and reverting back to the portion of the method 600 represented by block 650 in order to determine whether the next confidence score satisfies the one or more selection criteria.

In some implementations, a confidence score having the highest value of the plurality of confidence scores satisfies the one or more selection criteria. For example, the particular confidence score is associated with an attestation vector including attestation information most similar to corresponding attestation information within the trusted image vector. In some implementations, the comparison is made on a per category of attestation information basis. For example, a network operator selects a preset category of attestation information (e.g., process stamps), and the attestation vector having the highest confidence score with respect to the preset category is deemed to have particular confidence score. In some implementations, all or a subset of the categories of attestation information are considered, and optionally a network operator assigns each categories a weight value.

As represented by block 660, the method 600 includes directing, to the particular candidate next-hop node, a data packet destined for the destination node. In various implementations, directing the data packet corresponds to providing (e.g., transmitting) the data packet, destined for the destination node, to the particular candidate next-hop node. In various implementations, directing the data packet corresponds to providing attested route information to a source node associated with the data packet destined for the destination node.

As represented by block 660a, in various implementations, the method 600 includes a data tunnel between the particular candidate next-hop node and the networking device. In these implementations, the data packet is provided to the particular candidate next-hop node via the data tunnel.

As represented by block 670, in various implementations, the method 600 includes determining whether the particular confidence score falls below a confidence threshold. In various implementations, as represented by block 680, in response to determining that the particular confidence score falls below the confidence threshold, the networking device ceases to direct, to the particular candidate next-hop node, additional data packets destined for the destination node. In some implementations, the confidence score is preset by a network operator. For example, the current particular candidate next-hop node may be reconfigured with new configuration system information. In the event that the new configuration is sufficiently different from the corresponding attestation information in the trusted image vector, the networking device deems the current particular candidate next-hop node insufficiently trustworthy. In other words, the particular confidence score associated with the current particular candidate next-hop node falls below the confidence threshold. In response to determining that the particular confidence score falls below the confidence threshold, in various implementations, the method 600 reverts back to block 650.

Figure 7:
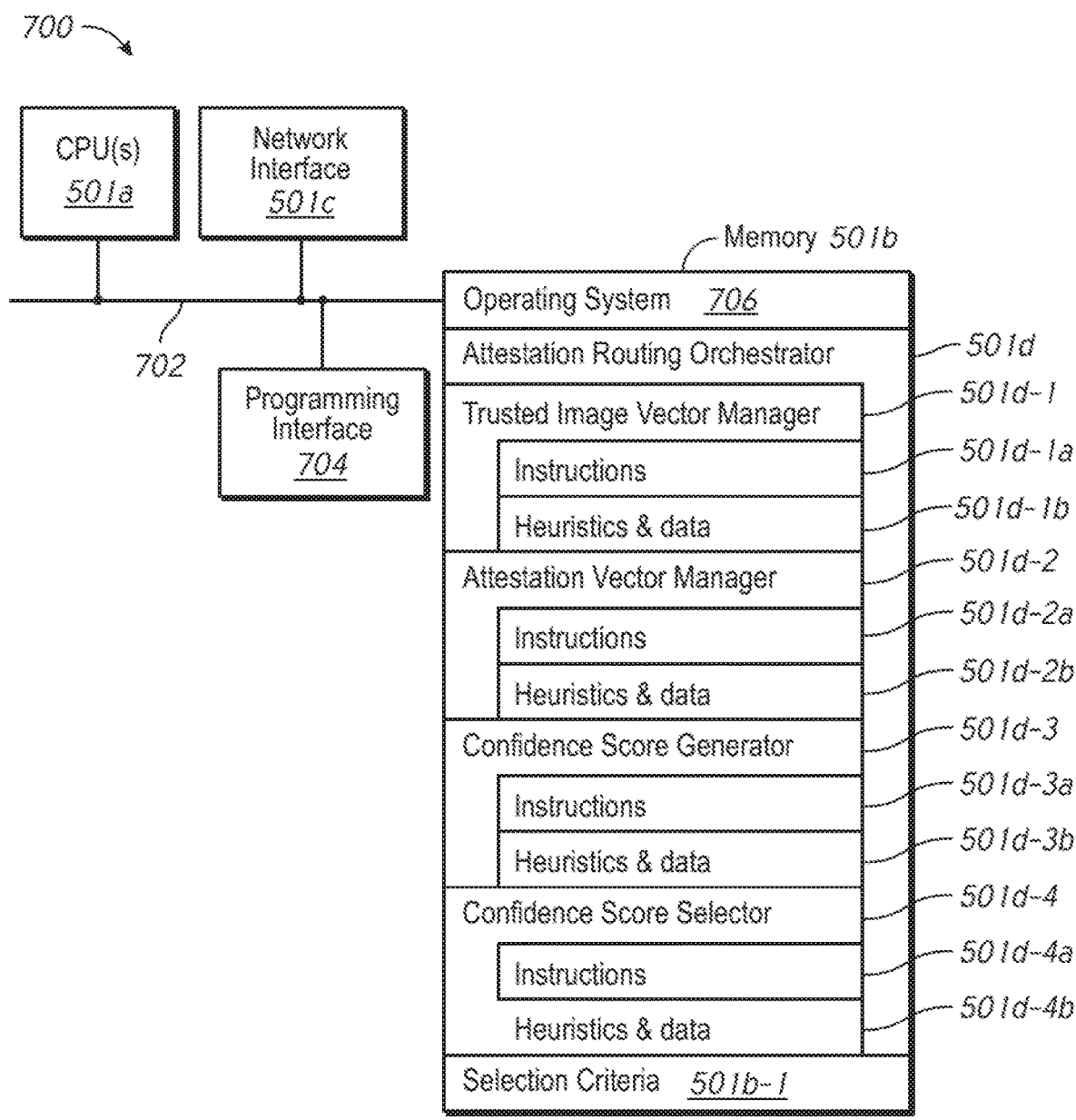
FIG. 7 is a block diagram of an example of a networking device in accordance with some implementations.

FIG. 7 is a block diagram of an example of a networking device 700 configured in accordance with some implementations. In some implementations, the networking device 700 is similar to and adapted from the attestation routing orchestrator 101 in FIG. 4. In some implementations, the networking device 700 is similar to and adapted from the source node 501 in FIG. 5. While certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the networking device 700 includes one or more processing units (CPU's) 501a, a network interface 501c, a memory 501b, a programming (I/O) interface 704, and one or more communication buses 702 for interconnecting these and various other components.

In some implementations, the one or more communication buses 702 include circuitry that interconnects and controls communications between system components. The memory 501b includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 501b optionally includes one or more storage devices remotely located from the CPU(s) 501a. The memory 501b includes a non-transitory computer readable storage medium. In some implementations, the memory 501b or the non-transitory computer readable storage medium of the memory 501b stores the following programs, modules and data structures, or a subset thereof including an optional operating system 706, an attestation routing orchestrator 501d, and one or more selection criteria 501b-1.

The operating system 706 includes procedures for handling various basic system services and for performing hardware dependent tasks.

In some implementations, the attestation routing orchestrator 501d is configured to carry out attestation based routing. To that end, in various implementations, the attestation routing orchestrator 501d includes a trusted image vector manager 501d-1, an attestation vector manager 501d-2, a confidence score generator 501d-3, and a confidence score selector 501d-4.

In some implementations, the trusted image vector manager 501d-1 is configured to obtain, from a trusted system, a trusted image vector including attestation information. To that end, in various implementations, the trusted image vector manager 501d-1 includes instructions and/or logic 501-1a and heuristics and metadata 501d-b.

In some implementations, the attestation vector manager 501d-2 is configured to obtain, from a plurality of candidate next-hop nodes, a corresponding first plurality of attestation vectors including attestation information. To that end, in various implementations, the attestation vector manager 501d-2 includes instructions and/or logic 501d-2a and heuristics and metadata 501d-2b.

In some implementations, the confidence score generator 501d-3 is configured to generate, based on the trusted image vector, the first plurality of attestation vectors, and optionally a second plurality of attestation vectors from corresponding candidate second-hop nodes, a plurality of confidence scores. To that end, in various implementations, the confidence score generator 501d-3 includes instructions and/or logic 501d-3a and heuristics and metadata 501d-3b.

In some implementations, the confidence score selector 501d-4 is select, from the plurality of confidence scores, a particular confidence score that satisfies one or more selection criteria 501b-1. To that end, in various implementations, the confidence score selector 501d-4 includes instructions and/or logic 501d-4a and heuristics and metadata 501d-4b.

Although the attestation routing orchestrator 501d, the trusted image vector manager 501d-1, the attestation vector manager 501d-2, the confidence score generator 501d-3, and the confidence score selector 501d-4 are illustrated as residing on a single device (e.g., the networking device 700), it should be understood that in other implementations, any combination of the attestation routing orchestrator 501d, the trusted image vector manager 501d-1, the attestation vector manager 501d-2, the confidence score generator 501d-3, and the confidence score selector 501d-4 may reside in separate computing devices. For example, each of the attestation routing orchestrator 501d, the trusted image vector manager 5014d-1, the attestation vector manager 501d-2, the confidence score generator 501d-3, and the confidence score selector 501d-4 may reside on a separate device.

Moreover, FIG. 7 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first signal characteristic, and, similarly, a second signal characteristic could be termed a first signal characteristic, which changing the meaning of the description, so long as all occurrences of the "first signal characteristic" are renamed consistently and all occurrences of the "second signal characteristic" are renamed consistently. The first signal characteristic and the second signal characteristic are both signal characteristics, but they are not the same signal characteristic.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a networking device including a non-transitory memory and one or more processors:
obtaining, according to a predefined protocol, a first plurality of attestation vectors from a corresponding plurality of candidate next-hop nodes, wherein each of the plurality of candidate next-hop nodes is included within a respective route between a particular node and a destination node;
determining a plurality of confidence scores, wherein each of the plurality of confidence scores is based on a comparison between a corresponding one of the first plurality of attestation vectors and a trusted image vector;
selecting, from the plurality of confidence scores, a particular confidence score that satisfies one or more selection criteria, wherein the particular confidence score is associated with a particular candidate next-hop node of the plurality of candidate next-hop nodes; and
directing, to the particular candidate next-hop node, a data packet destined for the destination node.

2. The method of claim 1, further comprising:
obtaining, according to the predefined protocol, a second plurality of attestation vectors from a corresponding plurality of candidate second-hop nodes, wherein each of the plurality of candidate second-hop nodes is included within a respective route between a corresponding one of the plurality of candidate next-hop nodes and the destination node;
wherein each of the plurality of confidence scores is additionally based on a comparison between a corresponding one of the second plurality of attention vectors and the trusted image vector in combination with the comparison between the corresponding one of the first plurality of attestation vectors and the trusted image vector.

3. The method of claim 1, wherein one or more of first plurality of attestation vectors are included within control plane payloads associated with layer-two (L2) link establishment processes between corresponding one or more candidate next-hop nodes and the networking device.

4. The method of claim 1, further comprising, instantiating a data tunnel between the particular candidate next-hop node and the networking device, wherein the data packet is provided to the particular candidate next-hop node via the data tunnel.

5. The method of claim 1, further comprising, obtaining the trusted image vector from a trusted system.

6. The method of claim 1, further comprising, obtaining the trusted image vector from a particular one of the plurality of candidate next-hop nodes, wherein the trusted image vector corresponds to a signed trusted image vector.

7. The method of claim 1, wherein the respective routes are independent of each other.

8. The method of claim 1, further comprising, in response to determining that the particular confidence score falls below a confidence threshold, ceasing to direct, to the particular candidate next-hop node, additional data packets destined for the destination node.

9. A networking device comprising:
an attestation vector manager to obtain, according to a predefined protocol, a first plurality of attestation vectors from a corresponding plurality of candidate next-hop nodes, wherein each of the plurality of candidate next-hop nodes is included within a respective route between a particular node and a destination node;
a confidence score generator to determine a plurality of confidence scores, wherein each of the plurality of confidence scores is based on a comparison between a corresponding one of the first plurality of attestation vectors and a trusted image vector; and
a confidence score selector to select, from the plurality of confidence scores, a particular confidence score that satisfies one or more selection criteria, wherein the particular confidence score is associated with a particular candidate next-hop node of the plurality of candidate next-hop nodes;
wherein the networking device directs, to the particular candidate next-hop node, a data packet destined for the destination node.

10. The networking device of claim 9, the attestation vector manager to obtain, according to the predefined protocol, a second plurality of attestation vectors from a corresponding plurality of candidate second-hop nodes, wherein each of the plurality of candidate second-hop nodes is included within a respective route between a corresponding one of the plurality of candidate next-hop nodes and the destination node;
wherein each of the plurality of confidence scores is additionally based on a comparison between a corresponding one of the second plurality of attention vectors and the trusted image vector in combination with the comparison between the corresponding one of the first plurality of attestation vectors and the trusted image vector.

11. The networking device of claim 9, wherein one or more of first plurality of attestation vectors are included within control plane payloads associated with layer-two (L2) link establishment processes between corresponding one or more candidate next-hop nodes and the networking device.

12. The networking device of claim 9, wherein the networking device further comprises a trusted image vector manager to obtain the trusted image vector from a trusted system.

13. The networking device of claim 9, wherein the networking device further comprises a trusted image vector manager to obtain the trusted image vector from a particular one of the plurality of candidate next-hop nodes, wherein the trusted image vector corresponds to a signed trusted image vector.

14. The method of claim networking device of claim 9, wherein the respective routes are independent of each other.

15. The networking device of claim 9, wherein the networking device ceases to direct, to the particular candidate next-hop node, additional data packets destined for the destination node in response to determining that the particular confidence score falls below a confidence threshold.

16. A non-transitory computer readable medium storing one or more programs, the one or more programs including instructions, which, when executed by one or more processors of a networking device, cause the networking device to:
obtain, according to a predefined protocol, a first plurality of attestation vectors from a corresponding plurality of candidate next-hop nodes, wherein each of the plurality of candidate next-hop nodes is included within a respective route between a particular node and a destination node;
determine a plurality of confidence scores, wherein each of the plurality of confidence scores is based on a comparison between a corresponding one of the first plurality of attestation vectors and a trusted image vector;
select, from the plurality of confidence scores, a particular confidence score that satisfies one or more selection criteria, wherein the particular confidence score is associated with a particular candidate next-hop node of the plurality of candidate next-hop nodes; and
direct, to the particular candidate next-hop node, a data packet destined for the destination node.

17. The non-transitory computer readable medium of claim 16, the one or more programs including further instructions to:
obtain, according to the predefined protocol, a second plurality of attestation vectors from a corresponding plurality of candidate second-hop nodes, wherein each of the plurality of candidate second-hop nodes is included within a respective route between a corresponding one of the plurality of candidate next-hop nodes and the destination node;
wherein each of the plurality of confidence scores is additionally based on a comparison between a corresponding one of the second plurality of attention vectors and the trusted image vector in combination with the comparison between the corresponding one of the first plurality of attestation vectors and the trusted image vector.

18. The non-transitory computer readable medium of claim 16, wherein one or more of first plurality of attestation vectors are included within control plane payloads associated with layer-two (L2) link establishment processes between corresponding one or more candidate next-hop nodes and the networking device.

19. The non-transitory computer readable medium of claim 16, the one or more programs including further instructions to obtain the trusted image vector from a particular one of the plurality of candidate next-hop nodes, wherein the trusted image vector corresponds to a signed trusted image vector.

20. The non-transitory computer readable medium of claim 16, wherein the respective routes are independent of each other.

* * * * *

UNITED STATES PATENT AND TRADEMARK OFFICE
CERTIFICATE OF CORRECTION

Page 1 of 1

PATENT NO. : 10,735,308 B2
APPLICATION NO. : 16/230751
DATED : August 4, 2020
INVENTOR(S) : Eric Voit It is certified that error appears in the above-identified patent and that said Letters Patent is hereby corrected as shown below:

In the Specification

Column 9, Line 21, should read:
being provided; and/or integrity of hardware components Column 12, Line 43, should read:
501d-1a and heuristics and metadata 501d-1b.

Column 13, Line 10, should read:
501d-1, the attestation vector manager 501d-2, the confi Signed and Sealed this
Eighth Day of December, 2020

Andrei Iancu
*Director of the United States Patent and Trademark Office*